US010917166B2

(12) United States Patent
Gaske (10) Patent No.: US 10,917,166 B2
(45) Date of Patent: Feb. 9, 2021

(54) DYNAMIC ALLOCATION OF SATELLITE GATEWAY ASSIGNMENTS

(71) Applicant: Hughes Network Systems, LLC, Germantown, MD (US)

(72) Inventor: T. Paul Gaske, Rockville, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 16/042,392

(22) Filed: Jul. 23, 2018

(65) Prior Publication Data
US 2020/0028581 A1    Jan. 23, 2020

(51) Int. Cl.
*H04B 7/0426* (2017.01)
*H04B 7/185* (2006.01)
*H04B 7/204* (2006.01)

(52) U.S. Cl.
CPC ......... *H04B 7/18563* (2013.01); *H04B 7/043* (2013.01); *H04B 7/18513* (2013.01); *H04B 7/18515* (2013.01); *H04B 7/2041* (2013.01)

(58) Field of Classification Search
CPC .... H04B 7/15; H04B 7/1851; H04B 7/18563; H04B 7/18528; H04B 7/043; H04B 7/18513; H04B 7/2041; H04B 7/18539
See application file for complete search history.

(56) References Cited

U.S. PATENT DOCUMENTS

| 5,612,701 | A | 3/1997 | Diekelman |
| 7,706,748 | B2 * | 4/2010 | Dutta .................. H04B 7/2041 370/316 |
| 8,712,321 | B1 * | 4/2014 | Dankberg .......... H04B 7/18513 455/12.1 |
| 2002/0058477 | A1 * | 5/2002 | Chapelle ............ H04B 7/18506 455/13.4 |

(Continued)

FOREIGN PATENT DOCUMENTS

| GB | 2 521 459 A | 6/2015 |
| WO | 2014/001837 A1 | 1/2014 |
| WO | 2014/043760 A1 | 3/2014 |

OTHER PUBLICATIONS

International Search Report and Written Opinion for PCT/US2019/041416 dated Oct. 7, 2019, all pages.

(Continued)

*Primary Examiner* — Said M Elnoubi
(74) *Attorney, Agent, or Firm* — Kilpatrick Townsend & Stockton LLP (57) ABSTRACT

Arrangements for optimizing bandwidth of a satellite communication link are presented. A first satellite gateway system may transmit a first data set to a satellite to be relayed by the satellite to a first instance of user equipment. A second satellite gateway system may transmit a second data set to the satellite to be relayed by the satellite to a second instance of user equipment. A satellite gateway management system may determine that the second satellite gateway system has (Continued)

greater available bandwidth. The satellite gateway management system may route a third data set to be transmitted to the first instance of user equipment to the second satellite gateway system. The second satellite gateway system may transmit the third data set and beam steering data to the satellite, such that the satellite targets a downlink spot beam on the first instance of user equipment.

17 Claims, 6 Drawing Sheets

(56) References Cited

U.S. PATENT DOCUMENTS

| | | | |
|---|---|---|---|
| 2002/0077099 A1 | 6/2002 | LaPrade | |
| 2002/0122408 A1 | 9/2002 | Mullins | |
| 2013/0252655 A1* | 9/2013 | Kim | H04B 7/0408 455/509 |
| 2017/0041066 A1 | 2/2017 | Chu | |
| 2018/0024540 A1* | 1/2018 | Livesay | G05B 19/41835 715/736 |
| 2018/0034540 A1* | 2/2018 | Buer | H04B 7/18534 |
| 2018/0287694 A1* | 10/2018 | Buehler | H04B 7/18513 |
| 2019/0253900 A1 | 8/2019 | Narasimha et al. | |

OTHER PUBLICATIONS

International Search Report and Written Opinion for PCT/US2019/041415 dated Oct. 7, 2019, all pages.

* cited by examiner

DYNAMIC ALLOCATION OF SATELLITE GATEWAY ASSIGNMENTS

CROSS-REFERENCES TO RELATED APPLICATIONS

This Application is related to U.S. patent application Ser. No. 16/042,384, entitled "Precise Beam Forming Based On User Equipment Location," filed on the same day as this Application, the entire disclosure of which is hereby incorporated by reference for all purposes.

BACKGROUND

A relay satellite may be used to relay data transmitted between multiple satellite gateway systems and multiple instances of user equipment. Typically, relay satellites transmit and receive using wide-area antenna signal beams with user equipment distributed over large swaths of geography, such as regions over a hundred miles in diameter. A particular satellite gateway system may be assigned to service user equipment in a particular geographic region. A satellite gateway system has a finite amount of uplink and downlink bandwidth with the relay satellite. If this bandwidth is consumed, user equipment within the geographic region serviced by the satellite gateway system may experience delays in data transmission and/or reduced transmission speeds.

SUMMARY

Various embodiments are described related to a method for optimizing bandwidth of a satellite communication link. In some embodiments, a method for optimizing bandwidth of a satellite communication link is described. The method may include transmitting, by a first satellite gateway system, a first data set to a satellite to be relayed by the satellite to a first instance of user equipment. The first instance of user equipment may be located within a first geographical region serviced by the first satellite gateway system. The method may include transmitting, by a second satellite gateway system, a second data set to the satellite to be relayed by the satellite to a second instance of user equipment. The second instance of user equipment may be located within a second geographical region serviced by the second satellite gateway system. The first satellite gateway system and the second satellite gateway system may use a same frequency to transmit data to the satellite. The first satellite gateway system and the second satellite gateway system may be geographically separated. The method may include determining, by a satellite gateway management system, that the second satellite gateway system may have greater available bandwidth than the first satellite gateway system. The method may include routing, by the satellite gateway management system, a third data set to be transmitted to the first instance of user equipment to the second satellite gateway system. The method may include transmitting, by the second satellite gateway system, the third data set and beam steering data to the satellite to be relayed by the satellite to the first instance of user equipment, such that the satellite may target a downlink spot beam on the first instance of user equipment based on the beam steering data transmitted with the third data set. The downlink spot beam may be used to transmit the third data set to the first instance of user equipment located within the first geographical region.

Embodiments of such a method may include one or more of the following features: The satellite communication link may be bidirectional and the method may further include receiving, by the satellite, uplink data from the first instance of user equipment. The method may include determining, by the satellite, the uplink data to be transmitted to the second satellite gateway system based on a locally-stored routing table stored by the satellite. The method may include transmitting, by the satellite, the uplink data to the second satellite gateway system. The method may further include updating, by the satellite, the locally-stored routing table to link the first instance of user equipment to the second satellite gateway system in response to receiving the third data set and the beam steering data from the second satellite gateway system. Transmitting, by the satellite, the fourth data set to the second satellite gateway system may be performed based on the locally-stored routing table. The method may further include receiving, by the satellite, uplink data to be transmitted to the second satellite gateway system and a gateway destination indicator. The gateway destination indicator may indicate that the second satellite gateway system is to receive the uplink data. The method may further include transmitting, by the satellite, the uplink data to the second satellite gateway system based on the gateway destination indicator. The beam steering data may include electronic antenna configuration settings. The beam steering data may include latitude and longitude coordinates. The method may further include receiving, by the second satellite gateway system via the satellite, during a first defined period of time, a request message from the first instance of user equipment requesting to send a fourth data set to the second satellite gateway system via the satellite. The request message may indicate a current location of the user equipment. The method may further include assigning, by the second satellite gateway system, a time slot for the first instance of user equipment to transmit the fourth data set to the second satellite gateway system. The method may further include transmitting, by the second satellite gateway system, a time slot assignment message to the user equipment that indicates the time slot via the satellite. The method may further include causing, by the second satellite gateway system, the satellite to target an up-stream spot beam for the time slot on the current location of the user terminal. The current location may be within the first geographic region. The method may further include receiving, by the second satellite gateway system via the satellite and the up-stream spot beam, the fourth data set from the user equipment transmitted during the time slot. The satellite being caused to target the downlink spot beam on the first instance of user equipment may include the downlink spot beam being centered on the current location of the user terminal. The satellite being caused to target the downlink spot beam on the first instance of user equipment may include the downlink spot beam being centered within a predefined distance on the current location of the user equipment. A beam width of the downlink spot beam may be sixty miles or less.

In some embodiments, a system for optimizing bandwidth of a satellite communication link is described. The system may include a first satellite gateway system in communication with a first satellite antenna that communicates with a satellite, the first satellite gateway system may be configured to transmit a first data set to a satellite to be relayed by the satellite to a first instance of user equipment. The first instance of user equipment may be located within a first geographical region serviced by the first satellite gateway system. The system may include a second satellite gateway system in communication with a second satellite antenna that communicates with the satellite, the second satellite gateway system may be configured to transmit a second data set to the satellite to be relayed by the satellite to a second instance of user equipment. The second instance of user equipment may be located within a second geographical region serviced by the second satellite gateway system. The first satellite gateway system and the second satellite gateway system may use a same frequency to transmit data to the satellite. The first satellite gateway system and the second satellite gateway system may be geographically separated. A satellite gateway management system may be configured to determine that the second satellite gateway system has greater available bandwidth than the first satellite gateway system. A satellite gateway management system may be configured to route a third data set to be transmitted to the first instance of user equipment to the second satellite gateway system. The second satellite gateway system may be further configured to transmit the third data set and beam steering data to the satellite to be relayed by the satellite to the first instance of user equipment, such that the satellite may target a downlink spot beam on the first instance of user equipment based on the beam steering data transmitted with the third data set. The downlink spot beam may be used to transmit the third data set to the first instance of user equipment located within the first geographical region.

Embodiments of such a system may include one or more of the following features: The system may further include the satellite. The satellite may be configured to receive uplink data from the first instance of user equipment. The satellite may be configured to determine the uplink data to be transmitted to the second satellite gateway system based on a locally-stored routing table stored by the satellite. The satellite may be configured to transmit the uplink data to the second satellite gateway system. The satellite may be further configured to update the locally-stored routing table to link the first instance of user equipment to the second satellite gateway system in response to receiving the third data set and the beam steering data from the second satellite gateway system. The satellite transmitting the fourth data set to the second satellite gateway system may be performed based on the locally-stored routing table. The system may further include the satellite. The satellite may be configured to receive uplink data to be transmitted to the second satellite gateway system and a gateway destination indicator. The gateway destination indicator may indicate that the second satellite gateway system is to receive the uplink data. The satellite may be configured to transmit the uplink data to the second satellite gateway system based on the gateway destination indicator. The beam steering data may include electronic antenna configuration settings. The beam steering data may include latitude and longitude coordinates. The second satellite gateway system may be further configured to receive, via the satellite, during a first defined period of time, a request message from the first instance of user equipment requesting to send a fourth data set to the second satellite gateway system via the satellite. The request message may indicate a current location of the user equipment. The second satellite gateway system may be further configured to assign a time slot for the first instance of user equipment to transmit the fourth data set to the second satellite gateway system. The second satellite gateway system may be further configured to transmit a time slot assignment message to the user equipment that indicates the time slot via the satellite. The second satellite gateway system may be further configured to cause the satellite to target an up-stream spot beam for the time slot on the current location of the user terminal. The current location may be within the first geographic region. The second satellite gateway system may be further configured to receive via the satellite and the up-stream spot beam, the fourth data set from the user equipment transmitted during the time slot. The satellite being caused to target the downlink spot beam on the first instance of user equipment may include the downlink spot beam being centered on the current location of the user terminal. The satellite being caused to target the downlink spot beam on the first instance of user equipment may include the downlink spot beam being centered within a predefined distance on the current location of the user equipment. A beam width of the downlink spot beam may be sixty miles or less.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Satellite gateway systems can serve as a communication link between various networks (e.g., the Internet, private corporate networks) and a relay satellite. The relay satellite can serve to relay data to and from instances of user equipment that are geographically dispersed. By the relay satellite and the satellite gateway systems permitting bidirectional communication, instances of user equipment can communicate with other computerized systems connected with the Internet, a corporate network, or some other public or private data source.

In order to maximize the amount of available bandwidth for communicating with instances of user equipment, multiple satellite gateway systems may be geographically distributed such that a same first communication frequency may be used by each of the satellite gateway systems to transmit data to the relay satellite and a same second communication frequency can be used by each of the satellite gateway systems to receive data from the relay satellite. Each of these uplink and downlink communication channels has a finite amount of data bandwidth. A particular satellite gateway system may typically handle all of the uplink data transmitted to the relay satellite and all of the downlink data received from the relay satellite for instances of user equipment in a defined geographic region. A wide-area antenna radiation beam pattern may be linked with a particular satellite gateway system that can allow data to be transmitted to and received from instances of user equipment throughout this defined geographic region.

Since the amount of bandwidth available to each satellite gateway system to communicate with the relay satellite has a maximum, the situation may arise where a particular satellite gateway system is operating at or near its maximum uplink and/or downlink bandwidth with the relay satellite. This may result in instances of user equipment that are serviced by the satellite gateway system experiencing delays in receiving and/or transmitting data, and/or slower data transmission speeds. However, at the same time, another satellite gateway system may be experiencing less uplink and/or downlink data traffic, resulting in excess uplink and/or downlink bandwidth between this other satellite gateway system and the relay satellite being available.

If a particular satellite gateway is inflexibly paired to a defined satellite antenna radiation beam pattern of the relay satellite, it may not be possible to use excess available bandwidth of another satellite gateway to service an instance of user equipment located outside of the geographic region serviced by the defined satellite antenna radiation beam pattern. However, if a satellite antenna radiation beam pattern can be steered to service an instance of user equipment that is outside of a geographic region linked with a particular satellite gateway system, then excess bandwidth available at satellite gateway systems may be dynamically allocated among instances of user equipment. Such an arrangement can help provide instances of user equipment consistent access to uplink and downlink bandwidth, regardless of whether the instance of user equipment is associated with a default satellite gateway system that is experiencing a maximum or near a maximum amount (e.g., above a defined threshold) of bandwidth usage to communicate with the relay satellite.

In embodiments detailed herein, the satellite antenna radiation beam pattern can be set ("steered") to provide a transmit and/or receive spot-beam for one or more instances of user equipment. Such one or more instances of user equipment may be located outside of a geographic region typically serviced by a satellite gateway system which typically routes communication with the instance of user equipment.

Figure 1:
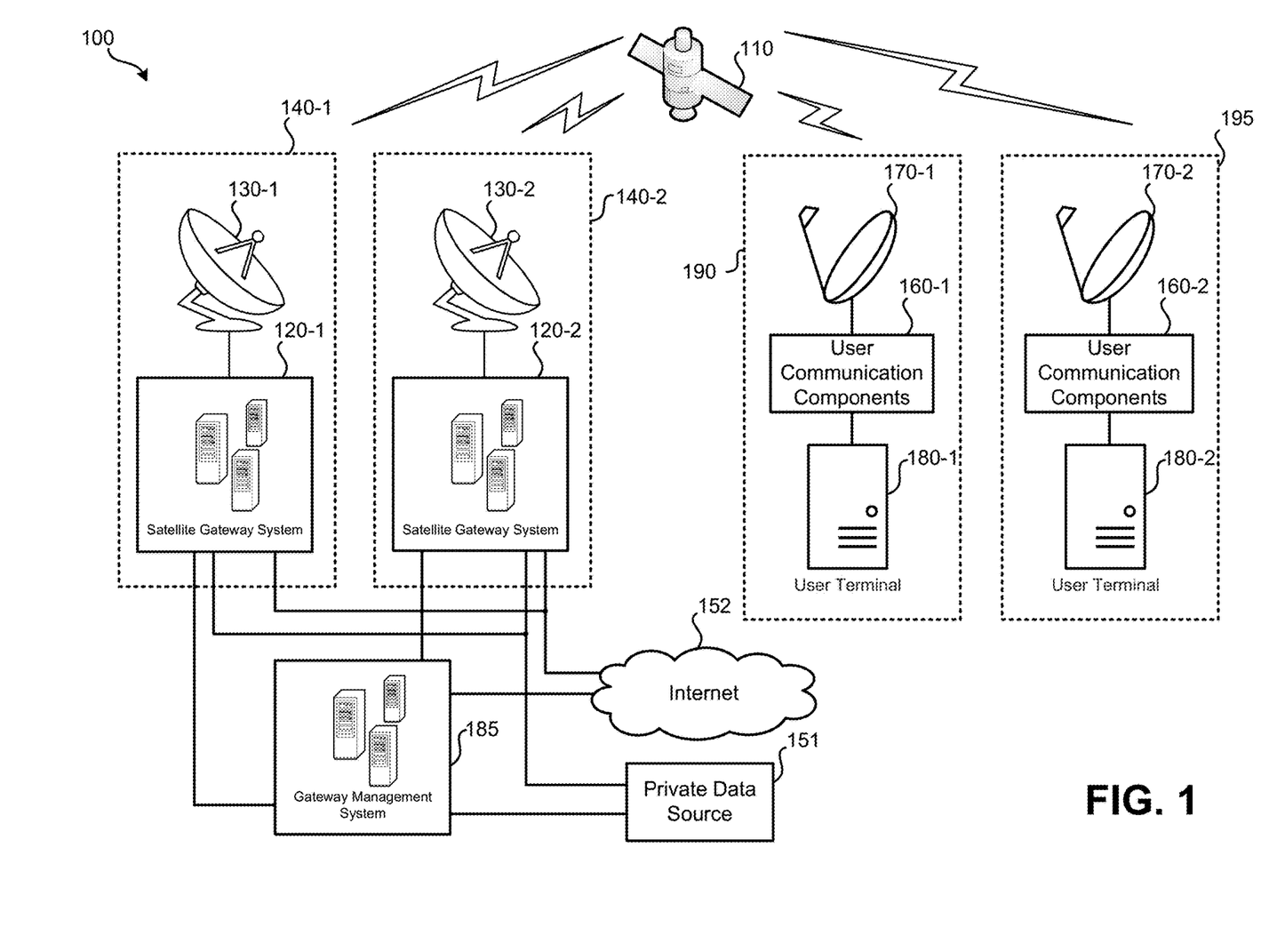
FIG. 1 illustrates an embodiment of a bidirectional satellite communication system.

Further detail regarding these concepts is provided in relation to the figures. FIG. 1 illustrates an embodiment of a bidirectional satellite communication system 100. Bidirectional satellite communication system 100 may include: relay satellite 110; satellite gateway systems 120; bidirectional satellite communication links 130; private data source 151; user communication components 160; satellite antennas 170; user terminals 180; and gateway management system 185. Relay satellite 110 may be a bidirectional communication satellite that relays uplink communications (to a satellite gateway from an instance of user equipment) and downlink communications (from a satellite gateway to an instance of user equipment) between satellite gateway systems 120 and satellite antennas 170. Therefore, via relay satellite 110 and satellite antennas 170, data may be transmitted from satellite gateway systems 120 to user communication components 160 and data may be transmitted from user communication components 160 to satellite gateway systems 120. Relay satellite 110 may use different frequencies for communication with satellite gateway systems 120 than for communication with user communication components 160. Further, different frequencies may be used for uplink communication than for downlink communication. The same frequency for uplink communications between satellite gateway systems 120-1, satellite gateway system 120-2, and relay satellite 110 may be used. Another frequency for downlink communications that is the same across the satellite gateway systems may be used for satellite gateway systems 120-1, satellite gateway system 120-2, and relay satellite 110. Further detail regarding relay satellite 110 is provided in reference to FIG. 2.

In some embodiments, system 100 may be used to provide user communication components 160 with Internet access. Additionally or alternatively, system 100 may be used to provide user communication components 160 with access to private data source 151, which may be a private network, data source, or server system. Gateway management system 185 may serve to manage communications between satellite gateway systems 120, instances of user equipment, Internet 152, and private data source 151.

Gateway management system 185 may be a group of one or more computer servers that communicate with multiple satellite gateway systems 120. Gateway management system 185 may have dedicated communication links with satellite gateway systems 120 or may communicate with satellite gateway systems 120 via Internet 152 or a quasi-dedicated communication channel. In some embodiments, satellite gateway systems 120 route requests for data from Internet 152 and/or private data source 151 through gateway management system 185. Gateway management system 185 may transmit to and/or retrieve requested data from Internet 152 and/or private data source 151. For data to be transmitted to the instance of user equipment, gateway management system 185 may route the data to a satellite gateway system of satellite gateway systems 120 that has available bandwidth. For instance, a particular satellite gateway system may by default service data requests for an instance of user equipment; however, if that particular satellite gateway system is at or near maximum bandwidth usage, gateway management system 185 may route the data to a different satellite gateway system for transmission to the user equipment via relay satellite 110. In such embodiments, gateway management system 185 functions as a routing system. It may receive requests from satellite gateway systems 120, transmit data to and retrieve data from Internet 152 and/or private data source 151, and/or reassign responsibility for receiving and/or transmitting data to an instance of user equipment among satellite gateway systems 120.

In some embodiments, hardware and/or software of satellite gateway systems 120 may be centralized at gateway management system 185. In such embodiments, satellite gateway systems 120 may only have hardware and software sufficient to transmit and receive data from relay satellite 110. A dedicated or shared high-speed communication link may be present between each satellite gateway system and centralized gateway management system 185, such as an optical fiber connection. Such a connection may allow for data to be transmitted over a large distance between gateway management system 185 and satellite gateway systems 120 with only a short time delay. Gateway management system 185 may function to transmit data to and retrieve data from Internet 152 and/or private data source 151. In such embodiments, satellite gateway management system 185 may, by default, have instances of user equipment assigned to a particular satellite gateway system, but may reassign instances of user equipment between satellite gateway systems based on uplink and downlink bandwidth available at individual satellite gateway systems. In other embodiments, no default satellite gateway system may be assigned to instances of user equipment; rather, gateway management system 185 may allocate and reallocate assignment of instances of user equipment between satellite gateway systems 120 based on uplink and downlink bandwidth usage between satellite gateway systems 120 and relay satellite 110.

In some embodiments, gateway management system 185 does not transmit and retrieve data from Internet 152 and/or private data source 151 on behalf of satellite gateway systems 120. Rather, gateway management system 185 monitors uplink and downlink bandwidth available among satellite gateway systems 120 and transmits management messages to satellite gateway systems 120 that cause instances of user equipment to be reassigned between satellite gateway systems 120. In such embodiments, satellite gateway systems 120 may directly transmit and receive data from Internet 152 and/or private data source 151 on behalf of user equipment. When gateway management system 185 determines communication with an instance of user equipment is to be transferred to a different satellite gateway system, gateway management system 185 may transmit one or more messages to satellite gateway systems 120 that cause the next data to be transmitted to the instance of user equipment to be transmitted from the reassigned satellite gateway system. By transmitting from the reassigned satellite gateway system, future received data from the instance of user equipment may by default be routed through the reassigned satellite gateway system. In some embodiments, a satellite gateway table, which may be stored by relay satellite 110 or may be stored by one or more of the satellite gateway systems, may be updated such that future communications with the instance of user equipment is routed through the reassigned satellite gateway system.

Satellite gateway system 120-1 may be located at geographic location 140-1. Satellite gateway system 120-1 may communicate with relay satellite 110 using bidirectional satellite link system 130-1, which can include one or more high-gain antennas that allow high data transmission rates between satellite gateway system 120-1 and relay satellite 110. Satellite gateway system 120-1 may receive data from and transmit data to many instances of user equipment, such as user communication components 160. Satellite gateway system 120-1 may serve to encode data into a proper format for relay by relay satellite 110. Similarly, satellite gateway system 120-1 may serve to decode data received from various instances of user communication components 160 received via relay satellite 110. Satellite gateway system 120-1 may serve as an intermediary between the satellite communication system and other data sources, such as private data source 151 and Internet 152. Satellite gateway system 121 may serve to receive requests from user communication components 160 via relay satellite 110 for data accessible using Internet 152. Satellite gateway system 120-1 may retrieve such data from Internet 152 and transmit the retrieved data to the requesting instance of user equipment via relay satellite 110. Additionally or alternatively, satellite gateway system 120-1 may receive requests from user communication components 160 via relay satellite 110 for data accessible in private data source 151. Satellite gateway system 120-1 may retrieve such data from private data source 151 and transmit the retrieved data to the requesting instance of user equipment via relay satellite 110. Further detail regarding a satellite gateway system, such as satellite gateway system 120-1 is provided in relation to FIG. 2.

Satellite gateway system 120-2 may function similarly to satellite gateway system 120-1, but may be located in a different physical location. While satellite gateway system 120-1 is located at geographic location 140-1, satellite gateway system 120-2 is located at geographic location 140-2. Co-located with satellite gateway system 120-2 may be bidirectional satellite communication link 130-2. Satellite gateway system 120-2 and bidirectional satellite communication link 130-2 may service a first group of user equipment while satellite gateway system 120-1 and bidirectional satellite communication link 130-1 may service another set of user equipment. Geographic locations 140-1 and 140-2 may be separated by a significant enough distance such that a same uplink frequency and a separate, same downlink frequency can be used for uplink and downlink communications, respectively, between bidirectional satellite communication links 130 and relay satellite 110 without a significant amount of interference occurring. Satellite gateway system 120-2 and bidirectional satellite communication link 130-2 may function similarly to satellite gateway system 120-1 and bidirectional satellite communication link 130-1 respectively. While two instances of satellite gateway systems 120 and bidirectional satellite communication links 130 are illustrated as part of system 100, it should be understood that in some embodiments many satellite gateway systems and bidirectional satellite communication links are present. For example, for a satellite-based Internet service provider, four to eight satellite gateway systems 120 and associated bidirectional satellite communication links 130 may be scattered geographically throughout a large region, such as North America.

User communication components 160, along with user terminals 180 and satellite antennas 170 (which are collectively referred to as "user equipment") may be located in a fixed geographic location or may be mobile. For example, user communication components 160-1, satellite antenna 170-1, and user terminal 180-1 may be located at a residence of a subscriber that has a service contract with the operator of satellite gateway systems 120. User communication components 160-1, satellite antenna 170-1, and user terminal 180-1 may be located at fixed location 190. Fixed location 190 may be a residence, a building, an office, a worksite, or any other fixed location at which access to Internet 152 and/or private data source 151 is desired. User communication components 160-2, satellite antenna 170-2, and user terminal 180-2 may be mobile. For instance, such equipment may be present in an airplane, ship, vehicle, or temporary installation. Such equipment may be present at geographic location 195; however, geographic location 195 may change frequently or constantly, such as if the airplane, ship, or vehicle is in motion.

Satellite antenna 170-1 may be a small dish antenna, approximately 50 to 100 centimeters in diameter. Satellite antenna 170-1 may be mounted in a location that is pointed towards relay satellite 110, which may be in a geosynchronous orbit around the earth. In some embodiments, relay satellite 110 may be in a low Earth orbit (LEO) or middle Earth orbit (MEO). As such, the direction in which satellite antenna 170-1 is to be pointed stays constant. In some embodiments, low Earth orbit (LEO) and medium Earth orbit (MEO) satellites may be used in place of a geosynchronous satellite in the system. User communication components 160-1 refer to the hardware necessary to translate signals received from relay satellite 110 via satellite antenna 170-1 into a format which user terminal 180-1 can decode. Similarly, user communication components 160-1 may encode data received from user terminal 180-1 into a format for transmission via satellite antenna 170-1 to relay satellite 110. User communication components 160-1 may include a satellite communication modem. This modem may be connected with or may have incorporated a wired or wireless router to allow communication with one or more user terminals. In system 100, a single user terminal, user terminal 180-1, is shown as in communication with user communication components 160-1. It should be understood that, in other embodiments, multiple user terminals may be in communication with user communication components 160-1 and may be using system 100 to access private data source 151 and/or Internet 152. User terminal 180-1 may be various forms of computerized devices, such as: a desktop computer; a laptop computer; a smart phone; a gaming system or device; a tablet computer; a music player; a smart home device; a smart sensor unit; Voice over IP (VoIP) device, or some other form of computerized device that can access Internet 152 and/or private data source 151. Since user communication components and a satellite antenna can continue communicating with a satellite gateway system even if a user terminal is not currently communicating with user communication components 160-1, it should be understood that some instances of user equipment may not include a user terminal.

Despite being in motion or in a temporary location, user communication components 160-2, satellite antenna 170-2, and user terminal 180-2 may function similarly to user communication components 160-1, satellite antenna 170-1, and user terminal 180-1. In some instances, satellite antenna 170-2 may either physically or electronically point its antenna beam pattern at relay satellite 110. For instance, as a flight path of an airplane changes, satellite antenna 170-2 may need to be aimed in order to receive data from and transmit data to relay satellite 110. As discussed in relation to the user terminal 180-1, only a single user terminal, user terminal 180-2, is illustrated as in communication with user communication components 160-2 as part of system 100. It should be understood that in other embodiments, multiple user terminals may be in communication with user communication components 160-2. For example, if such equipment is located on an airplane, many passengers may have computerized devices, such as laptop computers and smart phones, which are communicating with user communication components 160-2 for access to Internet 152 and/or private data source 151. As detailed in relation to user terminal 180-1, user terminal 180-2 may be various forms of computerized devices, such as those previously listed.

While FIG. 1 illustrates only two instances of user communication components 160, two instances of satellite antennas 170, and two instances of user terminals 180, it should be understood that this is for illustration purposes only. System 100 may involve hundreds or thousands of instances of satellite antennas, user equipment, and user terminals distributed across various geographic locations. Some number of these instances may be located in fixed locations while some of these instances may be mobile that periodically or constantly are changing in location. For the purposes of this document, it can be assumed that the position of user equipment, the satellite antenna to which the user equipment is in communication, and the one or more user terminals in communication with the user equipment are at the same location. While a user terminal may wirelessly communicate with user equipment from a short distance away (e.g., within 500 ft.), it can be assumed for the purposes of this document that the location of, for example, satellite antenna 170-1, user communication components 160-1, and user terminal 180-1 is the same location.

Figure 2:
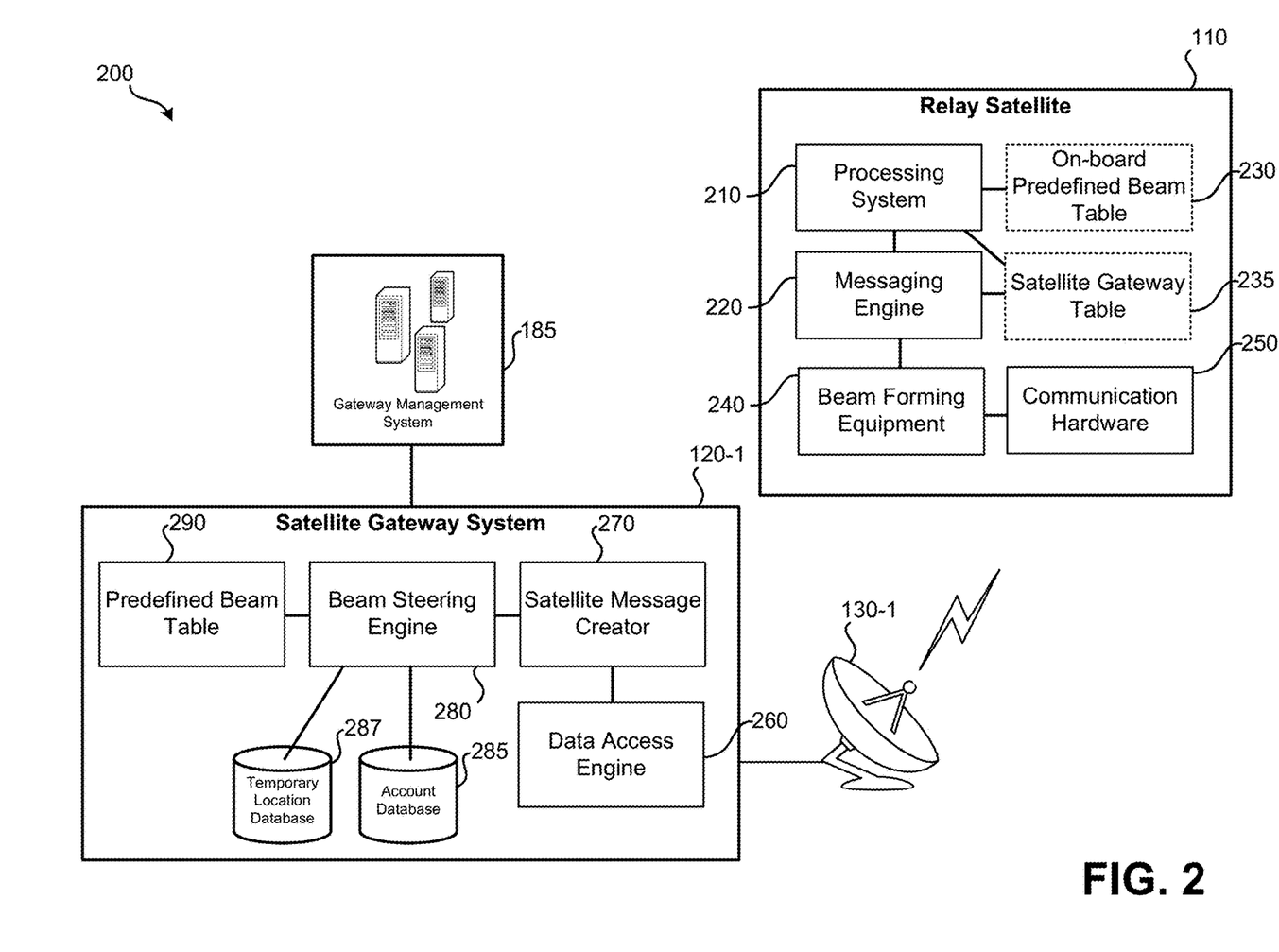
FIG. 2 illustrates an embodiment of a satellite gateway system and relay satellite.

FIG. 2 illustrates an embodiment 200 of satellite gateway system 120-1 in communication with gateway management system 185 and relay satellite 110. Embodiment 200 illustrates a greater level of detail of satellite gateway system 120-1 and relay satellite 110 than is shown in FIG. 1.

Referring first to relay satellite 110, relay satellite 110 may include: processing system 210; messaging engine 220; onboard predefined beam table 230; satellite gateway table 235; beam forming equipment 240; and communication hardware 250. Processing system 210 may include one or more processors and may serve to perform various forms of processing onboard relay satellite 110. For instance, processing system 210 may receive various commands of how to electronically align or steer one or more antennas, change physical alignment of an antenna, or reposition the satellite. Messaging engine 220 may serve to relay messages, such as in the form of data packets, between satellite gateway system 120-1 and one or more user terminals that are accessible via satellite antennas. Messaging engine 220 may further analyze a portion of the received message to determine how an antenna beam should be steered for communication with a particular instance of user equipment. For instance, messaging engine 220 may receive messages from user terminals via communication hardware 250 and/or may receive messages from satellite gateway system 120-1 that provide beam steering data. Such beam steering data may include electronic antenna configuration settings and may be provided to beam forming equipment 240, which may change electrical characteristics of a satellite antenna that is part of communication hardware 250 based on the electronic antenna configuration settings. By various electrical characteristics of a satellite antenna being changed, the antenna's radiation pattern may be altered. This radiation pattern may be altered for both receiving data from and transmitting data to a user terminal.

Beam forming equipment 240 may serve to alter the electrical characteristics of one or more pieces of communication hardware 250 to target the one or more satellite antennas' spot beams. Such altering of the antenna beam pattern for communication with user equipment may affect both the relay satellite's transmit (downlink) beam pattern and receive (uplink) beam pattern. By beam forming equipment 240 altering electrical characteristics of communication hardware 250, both the effective size of a beam (e.g., wide-area spot beams having a larger diameter between 3 dB signal strength drops as compared to the signal strength at the center of the beam, or a spot beam having a smaller distance between 3 dB signal strength drops as compared to the signal strength at the center of the beam, wherein the spot beam has a greater signal gain than the wide-area beam at its center) and the direction in which the beam is pointed may be adjusted. Communication hardware 250 may include one or more satellite antennas and one or more transponders that serve to relay data between satellite gateway system 120-1 and instances of user terminals and user equipment.

In some embodiments, on-board predefined beam table 230 may be stored using a non-transitory processor readable medium and may be accessible by processing system 210. On-board predefined beam table 230 may store beam steering data that define various antenna beam patterns that relate to locations of individual instances of user equipment or relate to predefined locations within a geographical area. For instance, onboard predefined beam table 230 may store a multitude of beam patterns that can be used to configure communication hardware 250 such that a large number of regions within the larger geographical area can be targeted using a spot beam such that signal strength is within 0.3 dB to 2 dB of the signal strength of the center of the beam. Each of these beam definitions may be linked with a unique spot beam identifier within onboard predefined beam table 230. Therefore, if one or more packets of data are to be transmitted to user equipment located in a particular location, satellite gateway system 120-1 may provide the spot beam identifier to relay satellite 110. Based on the spot beam identifier, beam forming equipment 240 may electronically alter characteristics of communication hardware 250 such that the user equipment is targeted by the antenna radiation pattern for transmitting the one or more packets to the user equipment. In some embodiments, based on location data (e.g., coordinates) received by processing system 210, processing system 210 may be able to calculate the beam steering data needed to control beam forming equipment 240 and communication hardware 250.

In other embodiments, rather than having processing performed at relay satellite 110, functionality of onboard predefined beam table 230 may be performed by satellite gateway system 120-1. Satellite gateway system 120-1 may provide beam steering data to relay satellite 110 that instructs beam forming equipment 240 how to configure an antenna radiation pattern of communication hardware 250 to target a particular piece or set of user equipment. Satellite gateway system 120-1 may include: data access engine 260; satellite message creator 270; beam steering engine 280; account database 285; and predefined beam table 290. Predefined beam table 290 may function similarly to onboard predefined beam table 230. That is, if satellite gateway system 120-1 has one or more packets of data that are to be transmitted to a particular instance of user equipment, beam steering engine 280 may access predefined beam table 290 to look up beam steering data necessary to create a particular spot beam. This beam steering data may be transmitted to beam forming equipment 240 such that communication hardware 250 can be configured to create the spot beam for transmitting and receiving data with the desired user equipment. In such embodiments, the processing necessary to perform lookups and store a beam table is performed by satellite gateway system 120-1 rather than relay satellite 110. In such embodiments, relay satellite 110 receives the particular beam steering data necessary for beamforming equipment 240 to configure communication hardware 250 to create the desired spot beam.

In some embodiments, beam steering engine 280 may access account database 285 in order to determine a location of user equipment. For example, a message from the user equipment may indicate an account identifier or user equipment identifier. This account identifier user equipment identifier may be used to perform a lookup in account database 285 to determine an address or other form of location linked with the account identifier or user equipment identifier. This location may be stored in the form of an address or coordinates. If stored in the form of an address, a further look up or analysis may be performed to determine coordinates that correspond to the address. In some embodiments, account database 285 may link account identifiers or user equipment identifiers directly with beamforming settings. Temporary location database 287 may be used to store the location, such as in the form of latitude and longitude coordinates, of user equipment that is either moving or is only temporarily stationary. When a message is received from such an instance of user equipment, indication of location, such as in the form of latitude and longitude coordinates may be received by satellite gateway system 120-1. The location, along with an account identifier or user equipment identifier, may be stored to temporary location database 287 such that a location of the user equipment is accessible for future instances when data is to be received or transmitted. Similar to account database 285, in some embodiments, the beam forming settings may be stored directly linked with the account identifier or user equipment identifier stored in temporary location database 287. In some embodiments, based on location data (e.g., coordinates) received by beam steering engine 280, beam steering engine 280 may be able to calculate the beam steering data needed to control beam forming equipment 240 and communication hardware 250. This calculated beam steering data may be transmitted to relay satellite 110 via satellite message creator 270.

Satellite message creator 270 may serve to create messages for transmission via bidirectional satellite communication link 130-1 to relay satellite 110. Messages created by satellite message creator 270 may include one or more data packets. The data transmitted as part of such messages may include beam steering data and the data to be relayed. Data access engine 260 may serve to access one or more external data sources, such as Internet 152 or private data source 151. That is, data access engine 260 may request and retrieve information based on received requests from user terminals.

Relay satellite 110 may, by default, relay communications received from user equipment in a particular geographic location to a particular satellite gateway system, such as satellite gateway system 120-1. For example, communication with user equipment located in the Colorado and Wyoming regions may by default be relayed to satellite gateway system 120-1. Data may be stored in satellite gateway table 235 that indicates an instance of user equipment for which uplink communications are to be routed to a different satellite gateway system. Gateway management system 185, communicating through a satellite gateway system, such as satellite gateway system 120-1, may update satellite gateway table 235 such that uplink communications from a particular instance of user equipment are relayed to a particular satellite gateway system, which may be other than the default satellite gateway system for the geographic region in which the instance of user equipment is located. In some embodiments, an instance of user equipment does not have a default satellite gateway system; rather, satellite gateway table 235 indicates an assignment of a satellite gateway system for each instance of user equipment communicating with relay satellite 110.

In some embodiments, rather than satellite gateway table 235 being maintained by relay satellite 110, uplink messages received from instances of user equipment may specify a particular satellite gateway system that is to receive the relayed communication. The user equipment may have previously received a message from gateway management system 185 via a downlink message that specifies through which satellite gateway system it should route future communications. Based upon the indication of a satellite gateway received from the instance of user equipment, relay satellite 110 may relay the uplink message to the appropriate satellite gateway system.

In other embodiments, relay satellite 110 may be configured to relay uplink messages to a same satellite gateway system from which a downlink message for the same instance of user equipment was received. For instance, if a downlink message is received from satellite gateway system 120-1 for a particular instance of user equipment, relay satellite 110 may store an entry in satellite gateway table 235 that links satellite gateway system 120-1 with an identifier of the instance of user equipment. Future uplink messages received from the instance of user equipment may then be relayed to satellite gateway system 120-1 based on the entry in satellite gateway table 235. If a future downlink message for the same instance of user equipment is then received from a different satellite gateway system (e.g., satellite gateway system 120-2 of FIG. 1), satellite gateway table 235 may be updated to reflect the new relationship.

While not illustrated as part of FIG. 2, satellite gateway system 120-1 may include one or more computer server systems. Beam steering engine 280, satellite message creator 270, and data access engine 260 may be implemented using software, firmware, and/or underlying computerized hardware. Such computer server systems may include one or more network interfaces, one or more processors, non-transitory computer readable storage mediums, communication buses, user interfaces, and other forms of computerized components. It should be understood that other satellite gateway systems, such as satellite gateway system 120-2, may function similarly to satellite gateway system 120-1.

Figure 3:
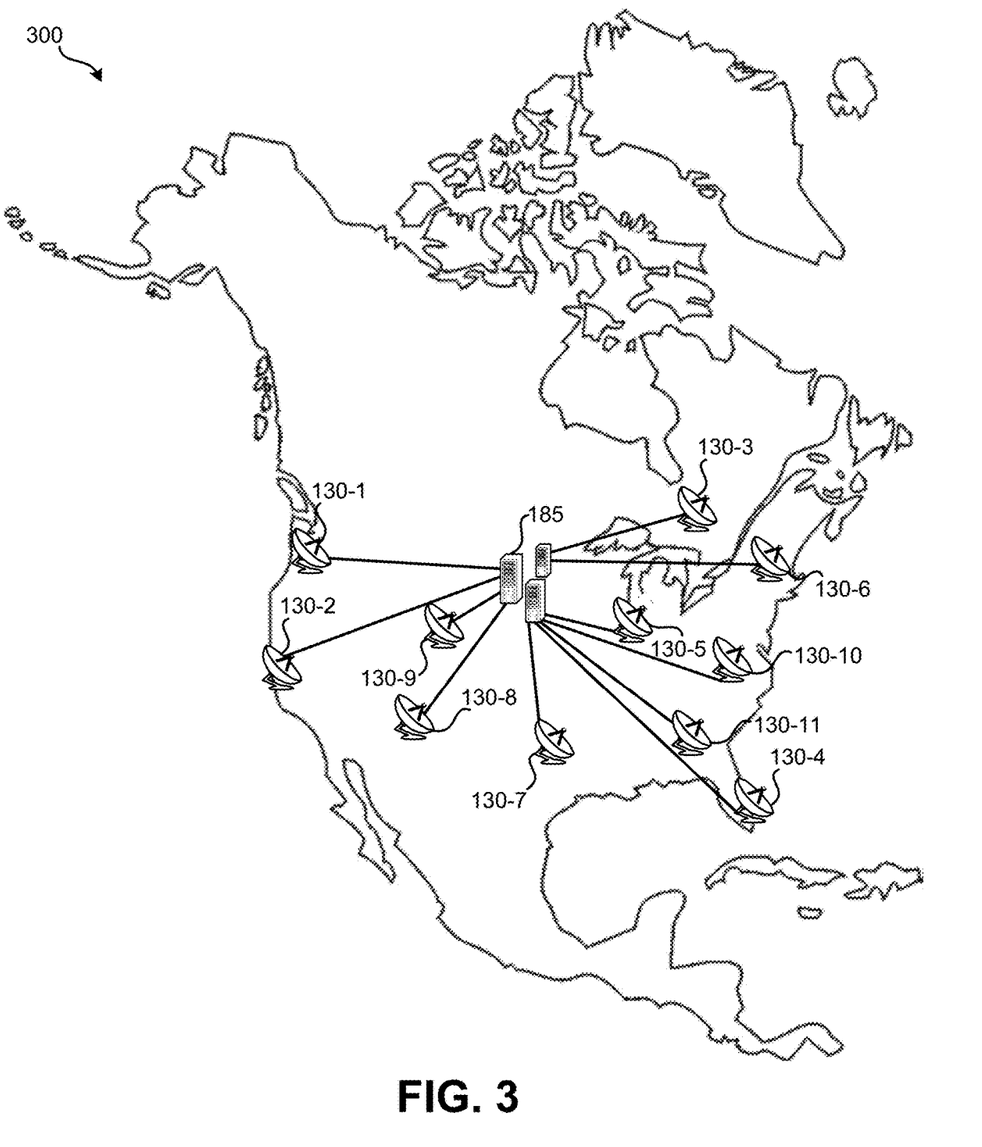
FIG. 3 illustrates an embodiment of multiple satellite gateway systems communicating with a relay satellite.

FIG. 3 illustrates an embodiment 300 of multiple satellite gateway systems 130 (130-1, 130-2, 130-3, 130-4, 130-5, 130-6, 130-7, 130-8, 130-9, 130-10, 130-11) that communicate with a relay satellite. Each of satellite gateway systems 130 may use a same frequency or frequency band for uplink communications with a relay satellite. Each of satellite gateway systems 130 may use a same frequency or frequency band (which differs from the frequency or frequency band used for uplink communications) for downlink communications with the relay satellite. By virtue of the satellite gateway systems 130 being geographically separated, the same frequencies or frequency bands for communication with the relay satellite can be reused.

Each of satellite gateway systems 130 may have a communication channel with gateway management system 185. Gateway management system 185 may reallocate uplink and downlink bandwidth between the satellite gateway systems and the relay satellite among the satellite gateway systems. The communication channels between the satellite gateway systems and the gateway management system 185 may be a dedicated high-bandwidth communication link or may be an Internet-based communication link. It should be understood that in some embodiments, more than one gateway management system 185 is present. For instance, a first gateway management system 185 may manage a first geographical region (e.g., the western United States) while a second gateway management system 185 may manage a second geographical region (e.g., the eastern United States). The numbers and locations of satellite gateway systems 130 are merely for example purposes. Fewer or greater numbers of satellite gateway systems may be in communication with one or more relay satellites and/or such satellite gateway systems (and the one or more gateway management systems 185) may be located in different physical locations.

Figure 4:
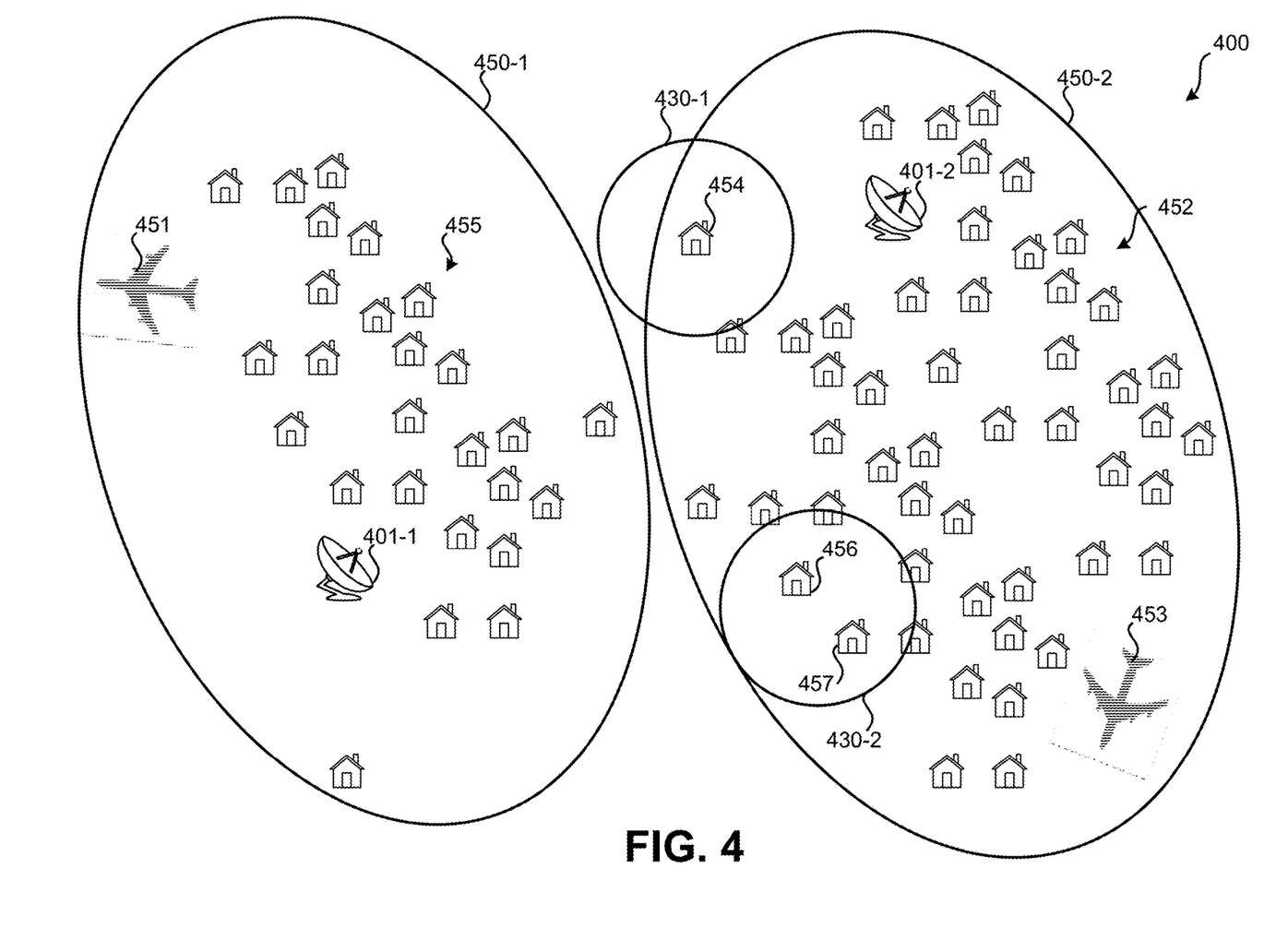
FIG. 4 illustrates an embodiment of satellite gateway systems and instances of user equipment.

FIG. 4 illustrates an embodiment 400 of satellite gateway systems and instances of user equipment. Each of the illustrated structures 455 and 452 represent a structure at which user equipment to communicate with a relay satellite is present. In embodiment 400, satellite gateway system 401-1, by default, services user equipment located at fixed locations at structures 455 and mobile user equipment, such as on airplane 451. Wide-area antenna radiation beam pattern 450-1 refers to a wide-area beam pattern used for transmitting and receiving data from user equipment located within beam pattern 450-1 with a relay satellite. Each of wide-area antenna radiation beam patterns 450 may have an edge defined as a 3 dB drop in signal strength as compared to a location on Earth at the center of the beam pattern. By default, uplink and downlink communications for user equipment at structure 455 and mobile user equipment, such as on airplane 451, may be routed through satellite gateway system 401-1. Satellite gateway system 401-2, by default, services user equipment located at fixed locations at structures 452 and mobile user equipment, such as on airplane 453. Wide-area antenna radiation beam pattern 450-2 refers to a wide-area beam pattern used for transmitting and receiving data from user equipment located within beam pattern 450-2 with the relay satellite. By default, uplink and downlink communications for user equipment at structures 452 and mobile user equipment, such as on airplane 453, may be routed through satellite gateway system 401-2.

As can be seen in embodiment 400, a greater number of structures 452 is present than structures 455. Since satellite gateway system 401-2 may have a same uplink and downlink bandwidth as satellite gateway system 401-1, it may be possible that satellite gateway system 401-2 reaches its maximum uplink and/or downlink bandwidth with the relay satellite while satellite gateway system 401-1 still has available uplink and/or downlink bandwidth. (It should be understood that the reverse situation may also be true, such as if user equipment serviced by satellite gateway system 401-1 happens to be sending and/or receiving a high volume of data.)

A targeted transmit and/or receive spot beam antenna radiation pattern may be used to target one or more instances of user equipment by the relay satellite. Spot beam 430-1 represents a transmit or receive spot beam pattern in which the edge of the spot beam indicates a 3 dB drop in signal strength as compared to a location on the earth's surface at the center of the spot beam. By a gateway management system performing a reassignment, rather than uplink and/or downlink transmissions with the relay satellite being handled by satellite gateway system 120-2, uplink and/or downlink transmissions for user equipment at structure 454 may be handled by satellite gateway system 401-1. Despite satellite gateway system 1304011 by default servicing user equipment within defined wide-area beam 450-1 that is linked with satellite gateway system 401-1, a targeted receive and/or transmit spot beam may be used by the relay satellite to target user equipment at structure 454 outside of defined wide-area beam 450-1 and route data related to communication with user equipment at structure 454 to satellite gateway system 401-1.

A targeted spot beam can refer to the antenna radiation beam pattern of the relay satellite being created such that the user equipment is at the center or near the center of the antenna spot beam radiation pattern on the surface of the Earth. In other embodiments, targeting the antenna radiation beam pattern of the relay satellite to create the spot beam may be done so that the user equipment is within a predefined distance of the center of the spot beam on the surface of the earth (e.g., within four miles). In other embodiments, targeting the antenna radiation beam pattern of the satellite to create the spot beam may be done so that the user equipment receives within 0.3 dB to 2 dB of the signal strength of the center of the spot beam. For example, spot beam 430-2, which represents a transmit or receive spot beam pattern in which the edge of the spot beam indicates a 3 dB drop in signal strength as compared to a location on the earth's surface at the center of the spot beam. This antenna radiation spot beam pattern may be used for transmitting and receiving with both instances of user equipment located at each structure within the region defined by spot beam 430-2.

Similar to user equipment at structure 454, by a gateway management system performing a reassignment, rather than uplink and/or downlink transmissions with the relay satellite being handled by satellite gateway system 120-2, uplink and/or downlink transmissions for user equipment at structures 456 and 457 may be handled by satellite gateway system 130-1. Despite satellite gateway system 120-1 by default servicing user equipment within defined wide-area beam 450-1, a targeted receive and/or transmit spot beam may be used by the relay satellite to target user equipment at structures 456 and 457, which are outside of defined wide-area beam 450-1 and route data related to communication with user equipment at structures 456 and 457 to satellite gateway system 130-1.

In some embodiments, user equipment that is targeted by a spot beam for communications with a different satellite gateway system, such as user equipment at structures 454, 456, and 457, may still receive broadcast data via wide area beam 450-2. That is, while a spot beam antenna radiation pattern is used for uplink and downlink communications specific to the instances of user equipment that have been reassigned to satellite gateway system 401-1, such instances of user equipment may still transmit reservation requests (e.g., to have the relay satellite target a receive spot beam aimed at the instance of user equipment) and receive broadcast messages through wide area beam 450-2. Further detail regarding a possible format of a reservation request is provided in relation to FIG. 5 of U.S. patent application Ser. No. 16/402,384, "Precise Beam Forming Based On User Equipment Location", filed on the same day as this application, the entire disclosure of which is hereby incorporated by reference for all purposes. Therefore, while a reservation request may be transmitted to the relay satellite on a receive beam pattern associated with satellite gateway system 401-2, when a spot beam is provided in response to the reservation request, the data transmitted via the receive spot beam may be routed to satellite gateway system 401-1.

Figure 5:
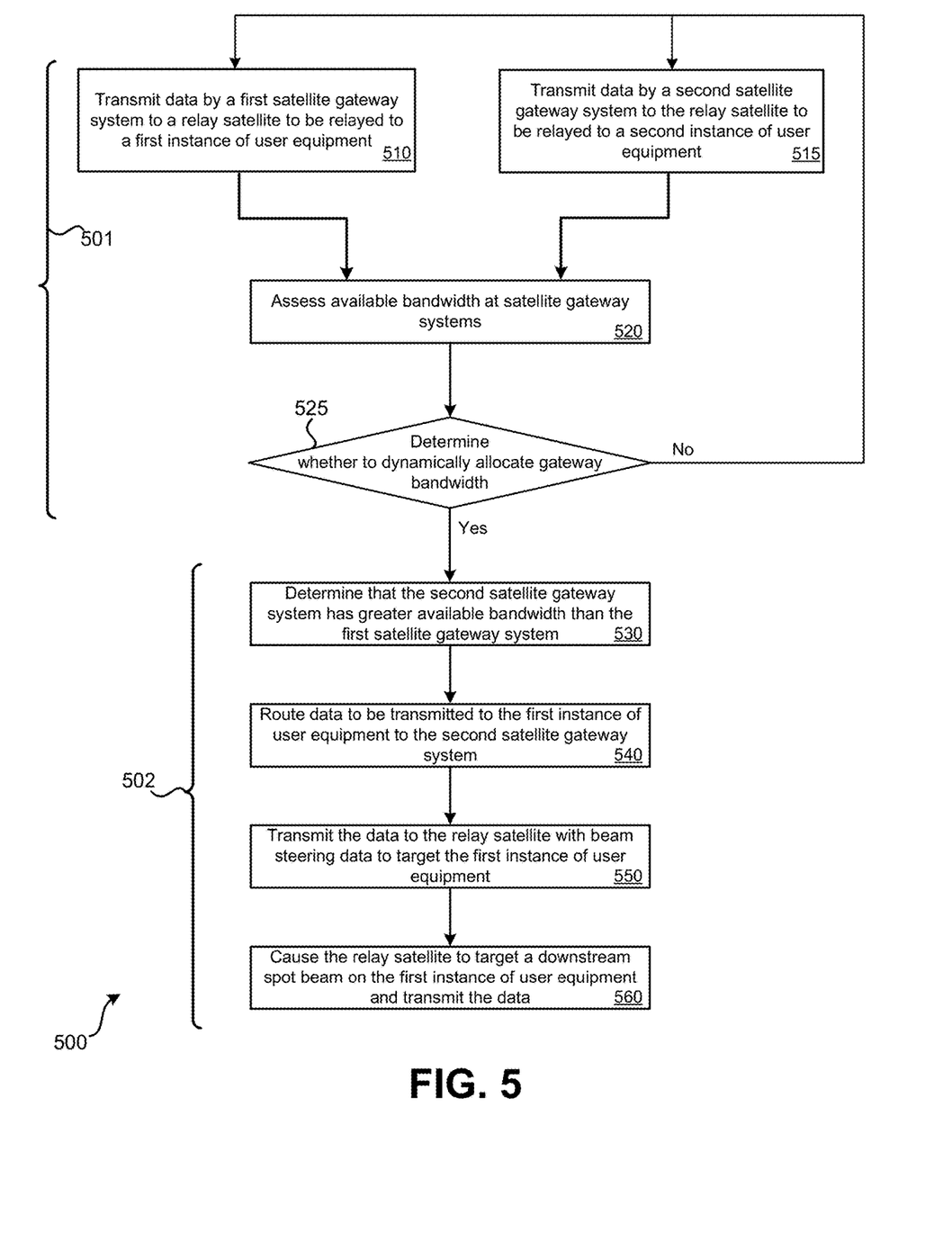
FIG. 5 illustrates an embodiment of a method for optimizing downlink bandwidth of a satellite communication link.

Various methods may be performed using the systems and embodiments detailed in relation to FIGS. 1-4. FIG. 5 illustrates an embodiment of a method 500 for optimizing downlink bandwidth of a satellite communication link. Blocks of method 500 may be performed using components of system 100, including satellite gateway systems and gateway management systems. It should be understood that while method 500 is focused on the situation in which a satellite gateway system reaches or is within a threshold of its maximum bandwidth usage, method 500 may also be used to reassign user equipment to another satellite gateway system if some event causes little or no bandwidth to be available at a satellite gateway system. For example, a weather event, power outage, software error, or hardware failure may interrupt communication between a satellite gateway system and a relay satellite. Effectively, such events may decrease the amount of uplink and/or downlink bandwidth present between a satellite gateway system and a relay satellite, possibly decreasing the amount of bandwidth to zero.

Blocks 510, 515, 520, and 525 can represent normal operation mode 501. During normal operation mode 501, each satellite gateway system may be responsible for uplink and downlink communications with a relay satellite for a defined set of user equipment. Each defined set of user equipment may be defined based on geographic location (e.g., all instances of user equipment within the northeastern part of the United States communicates with a particular satellite gateway system); and wide-area beam pattern (e.g., all instances of user equipment that receive or transmit within a particular wide-area beam pattern of the relay satellite; or some other metric). At block 510, a first satellite gateway system may transmit a first message (which can be one or more data packets) to a first instance of user equipment via a relay satellite. This instance of user equipment, by default, may be assigned to the first satellite gateway system. At block 520, a second satellite gateway system may transmit a second message (again, which can be one or more data packets) to a second instance of user equipment via the relay satellite. This second instance of user equipment, by default, may be assigned to the second satellite gateway system. Communications in the opposite direction, from the user equipment to the respective satellite gateway systems via the relay satellite, may also occur. During normal operation mode 501, uplink communications from the first instance of user equipment may be routed to the first satellite gateway system and uplink communications from the second instance of user equipment may be routed to the second satellite gateway system.

At block 520, a gateway management system may occasionally or periodically assess how uplink and/or downlink bandwidth is being utilized across multiple satellite gateway systems. In some embodiments, if data transmissions to and from satellite gateway systems are routed through a gateway management system, the gateway management system may monitor the bandwidth of data received from and transmitted to each satellite gateway system. In other embodiments, the satellite gateway system may periodically send a request to each satellite gateway system or may automatically receive information detailing an amount of uplink and/or downlink bandwidth between the satellite gateway system and relay satellite being used. In other embodiments, the satellite management system may only receive data indicative of uplink and/or downlink bandwidth usage from a satellite gateway system when the satellite gateway system is at or within a certain percentage of maximum uplink and/or downlink bandwidth usage. Following block 520, a determination may be based on the assessment of block 520. If bandwidth usage for uplink and/or downlink data transmissions for a satellite gateway system is above a defined threshold (e.g., a percentage of the maximum bandwidth), method 500 may proceed to block 530 and dynamic bandwidth allocation mode 502 may be entered. If the satellite gateway systems are operating below maximum uplink and/or downlink bandwidth or below the defined uplink and/or downlink bandwidth thresholds, the gateway management system may remain within normal operation mode 501 and blocks 510-525 may continue to repeat.

At block 530, the gateway management system may determine that the second satellite gateway system has greater available (uplink and/or downlink) bandwidth than the first satellite gateway system. In order to alleviate the amount of uplink and/or bandwidth being used between the first satellite gateway system and the relay satellite, communication with one or more instances of user equipment may be reassigned to the second satellite gateway system. While method 500 focuses on the reassignment of a single instance of user equipment, in practice, tens or hundreds of instances of user equipment may be reassigned.

At block 540, data that is to be transmitted to the first instance of user equipment may be caused to be routed to the second satellite gateway system for transmission to the relay satellite by the gateway management system. This may be accomplished in various ways in different embodiments. In some embodiments, data that is to be transmitted to the first instance of user equipment may be transmitted to the second satellite gateway system rather than the first satellite gateway system by the gateway management system. In such embodiments, the gateway management system may serve as an intermediary for data transmissions and data retrievals between satellite gateway systems and data sources, such as the Internet, a private database, or private network. In other embodiments, the gateway management system may instruct the first satellite gateway system to route data to be transmitted to the first instance of user equipment to the second satellite gateway system. The first or second satellite gateway system may readdress a source of the data such that the first instance of user equipment can determine from which satellite gateway system the data was transmitted. In other embodiments, in response to the first satellite gateway system determining that it is at or above a threshold of downlink bandwidth usage, the data to be transmitted to the first instance of user equipment may be routed to the gateway management system. The gateway management system may then route the data to the second satellite gateway system, which has potentially been selected from a group of multiple satellite gateway systems such as due to the second satellite gateway system having the most available bandwidth.

At block 550, the data to be transmitted to the first instance of user equipment may be transmitted to the relay satellite by the second satellite gateway system. The data transmitted to the relay satellite may include beam steering data that can be used by the relay satellite to target a downlink spot beam on the first instance of user equipment. The beam steering data can be based on location data of the first instance of user equipment. Further detail regarding location data and how such data is used to determine beam steering data is provided in the U.S. patent application Ser. No. 16/042,384, entitled "Precise Beam Forming Based On User Equipment Location."

At block 560, the relay satellite may use the beam steering information (and, possibly, an on-board predefined beam table) to use beam forming equipment to target a downlink spot beam on the first instance of user equipment. From the first instance of user equipment's perspective, it does not matter which satellite gateway system transmitted the data to the relay satellite. However, in some embodiments, in response to the data to be transmitted to the first instance of user equipment being received from the second satellite gateway system, the relay satellite may store an indication, such as in a satellite gateway table, that indicates that future uplink data from the first instance of user equipment is to be routed to the second satellite gateway system based on the previous downlink message of the first instance of user equipment having been received from the second satellite gateway system. In other embodiments, a control message may be sent from a satellite gateway system to the relay satellite to update the satellite gateway table. In some embodiments, downlink messages may be sent via the second satellite gateway system, but uplink messages may continue to be transmitted to the first satellite gateway system by the relay satellite by virtue of the first instance of user equipment being within a wide-area beam pattern linked with the first satellite gateway system. This wide-area beam pattern may be used as a receive beam pattern by the relay satellite to receive reservations for uplink data transmissions that are performed via a receive spot beam. In other embodiments, in response to the reservation request, a reservation management system, which may operate as part of a satellite gateway system or the gateway management system may assign the timeslot associated with the request to the second satellite gateway system such that the relay satellite relays the received data from the first instance of user equipment to the second satellite gateway system.

Figure 6:
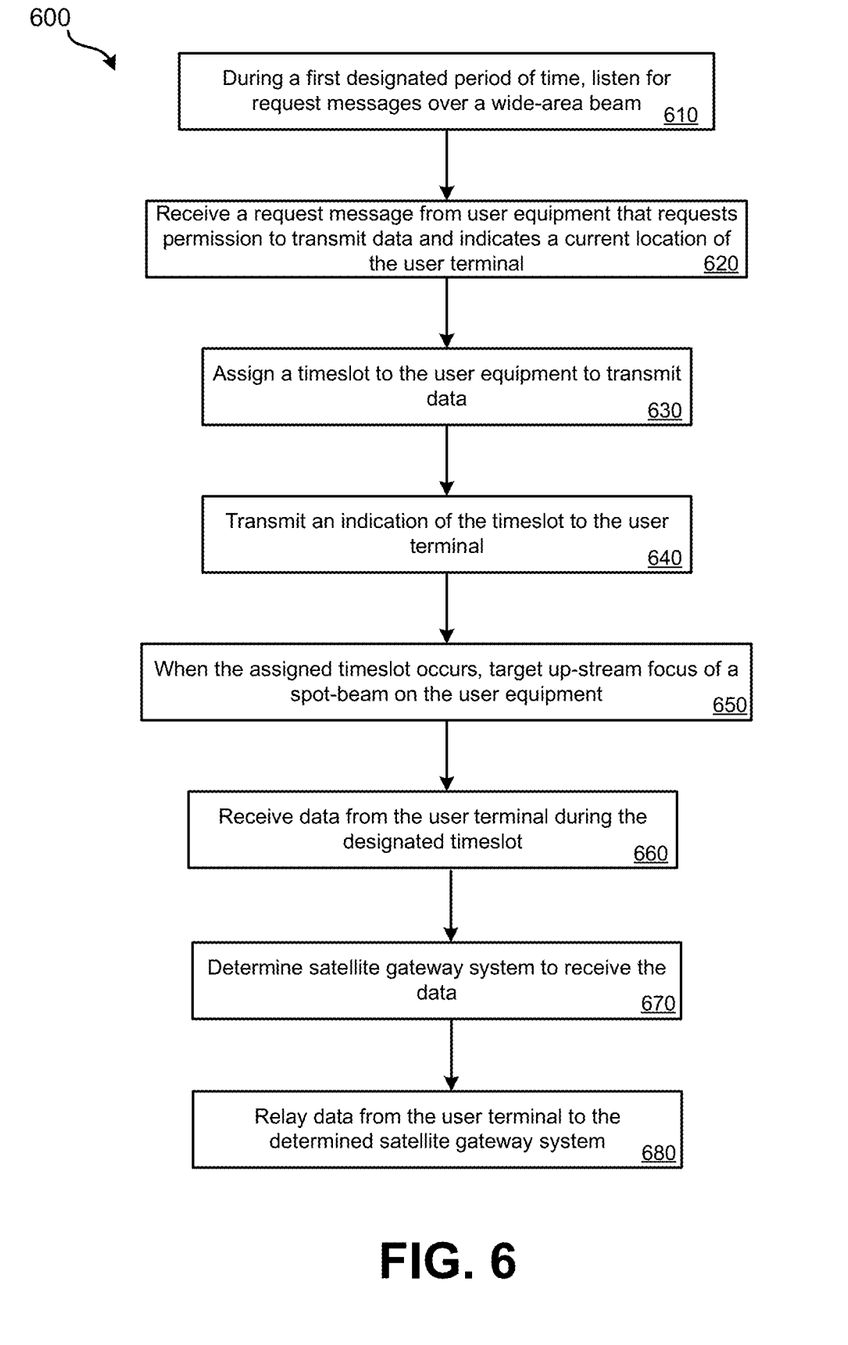
FIG. 6 illustrates an embodiment of a method for optimizing uplink bandwidth of a satellite communication link.

FIG. 6 illustrates an embodiment of a method for optimizing uplink bandwidth of a satellite communication link. Blocks of method 500 may be performed using components of system 100, including satellite gateway systems, gateway management systems, and a relay satellite. In method 600, the steps performed by a satellite gateway system can be performed by the first or second satellite gateway system of method 500 of FIG. 5. At block 610, during a first designated period of time, a relay satellite may listen for request messages, using a wide-area receive beam that has been created using a receive beam former that adjusts the antenna radiation pattern of an antenna of the satellite. This first designated period of time may occur during a location phase of an uplink frame.

At block 620, a request message may be received from an instance of user equipment that requests permission to transmit data and indicates a current location of the user terminal. As with block 610, block 620 may occur during the location phase of an uplink frame. The request for the permission to transmit data may include a request for a certain amount of bandwidth. That is, the user equipment may indicate an amount of data that is to be transmitted to the satellite gateway system via the relay satellite.

At least partially in response to the request for permission to transmit data, the satellite gateway system or the relay satellite may assign a time slot to the user equipment to transmit uplink data at block 630. In some embodiments, a receive time plan generator system is incorporated as part of the satellite gateway system that is responsible for assigning timeslots for user equipment to transmit uplink data to the relay satellite. This may include one or more timeslots within a receive focus phase of an uplink frame, which may be a later uplink frame from the uplink frame used for communication at block 520. That is, a request for bandwidth may be transmitted in the first uplink frame, but one or more timeslots may not be assigned until a second, later uplink frame by the satellite gateway system or the relay satellite.

At block 640, an indication of the timeslot assigned to the user equipment may be transmitted by the satellite gateway system to the user equipment via the relay satellite, or may be determined by the relay satellite and transmitted directly to the user equipment.

When the assigned timeslot occurs at block 650, a receive spot beam may be formed and targeted on the user equipment. Based on the location of the user equipment, the satellite gateway system may provide beam steering data to the relay satellite or the relay satellite may determine such beamforming data on its own. Determining beam steering data may include: 1) performing a look-up in a database or table of locations stored by the satellite gateway system or relay satellite based on a user equipment identifier or an account identifier; 2) calculating beam steering data based on user equipment location coordinates or location by the satellite gateway system or relay satellite; and/or 3) performing a look-up in a database or table of beam steering data based on coordinates, an address, a user equipment identifier, or an account identifier by the satellite gateway system or relay satellite.

At block 660, data may be received by the relay satellite using the targeted receive spot beam during the assigned timeslot. Since multiple timeslots are present within an uplink frame, multiple targeted receive spot beams may be targeted at different user equipment during different assigned timeslots such that each of the instances of user equipment can obtain the high-bandwidth available via a high-frequency and high-bandwidth targeted spot beam.

At block 670, a determination may be made as to which satellite gateway system is to receive the uplink data. In some embodiments, the uplink data may include a gateway destination indicator that identifies a satellite gateway system that is to receive the relayed data. The relay satellite may read this gateway destination indicator and may cause the relay satellite to relay the uplink data to the indicated satellite gateway system. In other embodiments, the data may be relayed to a particular satellite gateway system by virtue of the user equipment making the request at block 620 using a particular wide-area receive beam. That is, a particular wide-area receive beam may be linked to a particular satellite gateway system. In some embodiments, the relay satellite may store a satellite gateway table that indicates to which satellite gateway system data from the first instance of user equipment is to be routed. The relay satellite may store data to the satellite gateway table that indicates from which satellite gateway system the previous downlink data to the first instance of user equipment was received. The relay satellite may then transmit uplink data from the first instance of the user equipment to the same satellite gateway based on the satellite gateway table. In other embodiments, a control message may be received by the relay satellite that indicates to which satellite gateway system uplink data from the first instance of user equipment should be routed.

At block 680, the uplink data received via the antenna radiation pattern spot beam by the relay satellite may be relayed to the satellite gateway system determined at block 670 by the relay satellite. The satellite gateway system that receives that data may then handle the data (e.g., transmit to a destination on the Internet, retrieve requested information, forward to the gateway management system, etc.).

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for optimizing bandwidth of a satellite communication link, the method comprising:
   transmitting, by a first satellite gateway system of a plurality of satellite gateway systems, a first data set to a satellite to be relayed by the satellite to a first instance of user equipment, wherein the first instance of user equipment is located within a first geographical region serviced by the first satellite gateway system;
   transmitting, by a second satellite gateway system of the plurality of satellite gateway systems, a second data set and beam steering information to the satellite such that the satellite uses the beam steering information to target a downlink spot beam on the first instance of user equipment for transmission of the second data set, wherein:
      the second instance of user equipment is located within a second geographical region serviced by the second satellite gateway system;
      the first satellite gateway system and the second satellite gateway system use a same frequency to transmit data to the satellite; and
      the first satellite gateway system and the second satellite gateway system are geographically separated;
   determining, by a satellite gateway management system, that the second satellite gateway system has greater available bandwidth than the first satellite gateway system;
   routing, by the satellite gateway management system, a third data set to be transmitted to the first instance of user equipment to the second satellite gateway system;
   transmitting, by the second satellite gateway system, the third data set and the beam steering information to the satellite such that the satellite uses the beam steering information to target a downlink spot beam on the first instance of user equipment for transmission of the third data set, wherein:
      the downlink spot beam is used to transmit the third data set to the first instance of user equipment located within the first geographical region; and
   in response to the second satellite gateway system having been the particular satellite gateway system of the plurality of satellite gateway systems that transmitted the third data set to the satellite, updating, by the satellite, a locally-stored routing table to link the first instance of user equipment to the second satellite gateway system such that future uplink data from the first instance of user equipment is routed to the second satellite gateway system by the satellite.

2. The method for optimizing bandwidth of the satellite communication link of claim 1, wherein the satellite communication link is bidirectional and the method further comprises:
   receiving, by the satellite, uplink data from the first instance of user equipment;

determining, by the satellite, the uplink data is to be transmitted to the second satellite gateway system based on the locally-stored routing table stored by the satellite; and transmitting, by the satellite, the uplink data to the second satellite gateway system.

3. The method for optimizing bandwidth of the satellite communication link of claim 1, further comprising:

receiving, by the satellite, uplink data to be transmitted to the second satellite gateway system and a gateway destination indicator, wherein the gateway destination indicator indicates that the second satellite gateway system is to receive the uplink data; and transmitting, by the satellite, the uplink data to the second satellite gateway system based on the gateway destination indicator.

4. The method for optimizing bandwidth of the satellite communication link of claim 1, wherein beam steering data is transmitted with the third data set and the beam steering data comprises latitude and longitude coordinates.

5. The method for optimizing bandwidth of the satellite communication link of claim 1, wherein the satellite being caused to target the downlink spot beam on the first instance of user equipment comprises the downlink spot beam being centered on the current location of the first instance of user equipment.

6. The method for optimizing bandwidth of the satellite communication link of claim 1, wherein the satellite being caused to target the downlink spot beam on the first instance of user equipment comprises the downlink spot beam being centered within a predefined distance on the current location of the first instance of user equipment.

7. The method for optimizing bandwidth of the satellite communication link of claim 1, wherein a beam width of the downlink spot beam is sixty miles or less.

8. A method for optimizing bandwidth of a satellite communication link, the method comprising:

transmitting, by a first satellite gateway system, a first data set to a satellite to be relayed by the satellite to a first instance of user equipment, wherein the first instance of user equipment is located within a first geographical region serviced by the first satellite gateway system;

transmitting, by a second satellite gateway system, a second data set to the satellite to be relayed by the satellite to a second instance of user equipment, wherein:

the second instance of user equipment is located within a second geographical region serviced by the second satellite gateway system;

the first satellite gateway system and the second satellite gateway system use a same frequency to transmit data to the satellite; and the first satellite gateway system and the second satellite gateway system are geographically separated;

determining, by a satellite gateway management system, that the second satellite gateway system has greater available bandwidth than the first satellite gateway system;

routing, by the satellite gateway management system, a third data set to be transmitted to the first instance of user equipment to the second satellite gateway system;

transmitting, by the second satellite gateway system, the third data set and beam steering data to the satellite to be relayed by the satellite to the first instance of user equipment, such that the satellite targets a downlink spot beam on the first instance of user equipment based on the beam steering data transmitted with the third data set, wherein the downlink spot beam is used to transmit the third data set to the first instance of user equipment located within the first geographical region;

receiving, by the second satellite gateway system via the satellite, during a first defined period of time, a request message from the first instance of user equipment requesting to send a fourth data set to the second satellite gateway system via the satellite, wherein the request message indicates a current location of the first instance of user equipment;

assigning, by the second satellite gateway system, a time slot for the first instance of user equipment to transmit the fourth data set to the second satellite gateway system;

transmitting, by the second satellite gateway system, a time slot assignment message to the first instance of user equipment that indicates the time slot via the satellite;

causing, by the second satellite gateway system, the satellite to target an up-stream spot beam for the time slot on the current location of the first instance of user equipment wherein the current location is within the first geographic region; and receiving, by the second satellite gateway system via the satellite and the up-stream spot beam, the fourth data set from the first instance of user equipment transmitted during the time slot.

9. A system for optimizing bandwidth of a satellite communication link, the system comprising:

a satellite;

a first satellite gateway system of a plurality of satellite gateway systems in communication with a first satellite antenna that communicates with the satellite, the first satellite gateway system configured to:

transmit a first data set and beam steering information to the satellite such that the satellite uses the beam steering information to target a downlink spot beam on a first instance of user equipment for transmission of the first data set, wherein the first instance of user equipment is located within a first geographical region serviced by the first satellite gateway system;

a second satellite gateway system in communication with a second satellite antenna that communicates with the satellite, the second satellite gateway system configured to:

transmit a second data set and beam steering information to the satellite such that the beam steering information is used by the satellite to target a downlink spot beam on the first instance of user equipment for transmission of the second data set, wherein:

the second instance of user equipment is located within a second geographical region serviced by the second satellite gateway system;

the first satellite gateway system and the second satellite gateway system use a same frequency to transmit data to the satellite; and the first satellite gateway system and the second satellite gateway system are geographically separated; and a satellite gateway management system configured:

to determine that the second satellite gateway system has greater available bandwidth than the first satellite gateway system; and route a third data set to be transmitted to the first instance of user equipment to the second satellite gateway system; wherein the second satellite gateway system is further configured to:
  transmit the third data set and beam steering information to the satellite, such that the satellite targets a downlink spot beam on the first instance of user equipment to transmit the third data set wherein:
    the downlink spot beam is used to transmit the third data set to the first instance of user equipment located within the first geographical region; and
    in response to the second satellite gateway system having been the particular satellite gateway system of the plurality of satellite gateway systems that transmitted the third data set to the satellite, the satellite is configured to update a locally-stored routing table to link the first instance of user equipment to the second satellite gateway system such that future uplink data from the first instance of user equipment is to be routed to the second satellite gateway system by the satellite.

10. The system for optimizing bandwidth of the satellite communication link of claim 9, the system further comprising the satellite, the satellite being configured to:
  receive uplink data from the first instance of user equipment;
  determine the uplink data is to be transmitted to the second satellite gateway system based on the locally-stored routing table stored by the satellite; and
  transmit the uplink data to the second satellite gateway system.

11. The system for optimizing bandwidth of the satellite communication link of claim 10, wherein
  the satellite transmitting a fourth data set to the second satellite gateway system is performed based on the locally-stored routing table.

12. The system for optimizing bandwidth of the satellite communication link of claim 9, the system further comprising the satellite, wherein the satellite is configured to:
  receive uplink data to be transmitted to the second satellite gateway system and a gateway destination indicator, wherein the gateway destination indicator indicates that the second satellite gateway system is to receive the uplink data; and
  transmit the uplink data to the second satellite gateway system based on the gateway destination indicator.

13. The system for optimizing bandwidth of the satellite communication link of claim 9, wherein beam steering data is transmitted to the satellite with the third data set and the beam steering data comprises latitude and longitude coordinates.

14. The system for optimizing bandwidth of the satellite communication link of claim 9, wherein the second satellite gateway system is further configured to:
  receive, via the satellite, during a first defined period of time, a request message from the first instance of user equipment requesting to send a fourth data set to the second satellite gateway system via the satellite, wherein the request message indicates a current location of the first instance of user equipment;
  assign a time slot for the first instance of user equipment to transmit the fourth data set to the second satellite gateway system;
  transmit a time slot assignment message to the first instance of user equipment that indicates the time slot via the satellite;
  cause the satellite to target an up-stream spot beam for the time slot on the current location of the first instance of user equipment wherein the current location is within the first geographic region; and
  receive via the satellite and the up-stream spot beam, the fourth data set from the first instance of user equipment transmitted during the time slot.

15. The system for optimizing bandwidth of the satellite communication link of claim 9, wherein the satellite being caused to target the downlink spot beam on the first instance of user equipment comprises the downlink spot beam being centered on the current location of the first instance of user equipment.

16. The system for optimizing bandwidth of the satellite communication link of claim 9, wherein the satellite being caused to target the downlink spot beam on the first instance of user equipment comprises the downlink spot beam being centered within a predefined distance on the current location of the first instance of user equipment.

17. The system for optimizing bandwidth of the satellite communication link of claim 9, wherein a beam width of the downlink spot beam is sixty miles or less.

* * * * *